March 26, 1935.  J. SALTZMAN  1,995,582
END GATE
Filed April 4, 1934   2 Sheets-Sheet 1
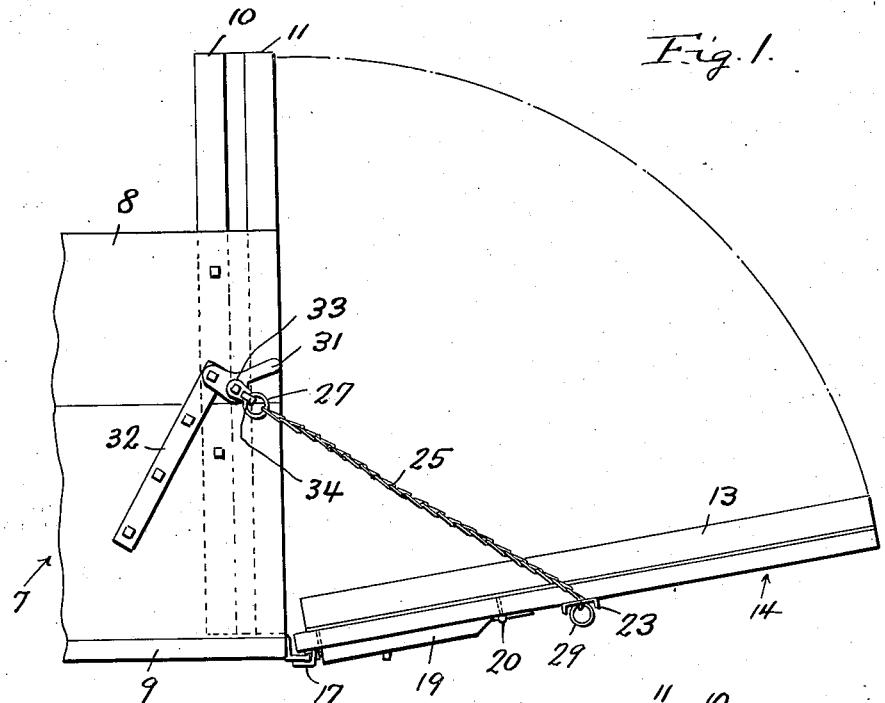
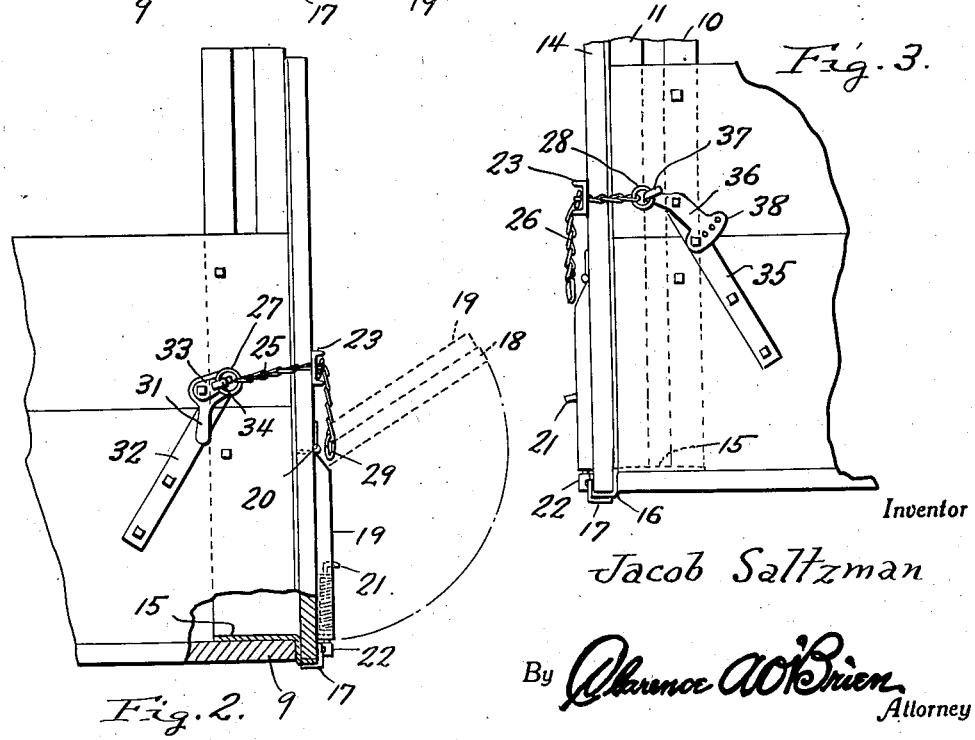
Inventor
Jacob Saltzman
By Clarence A. O'Brien
Attorney March 26, 1935.  J. SALTZMAN  1,995,582
END GATE
Filed April 4, 1934   2 Sheets-Sheet 2
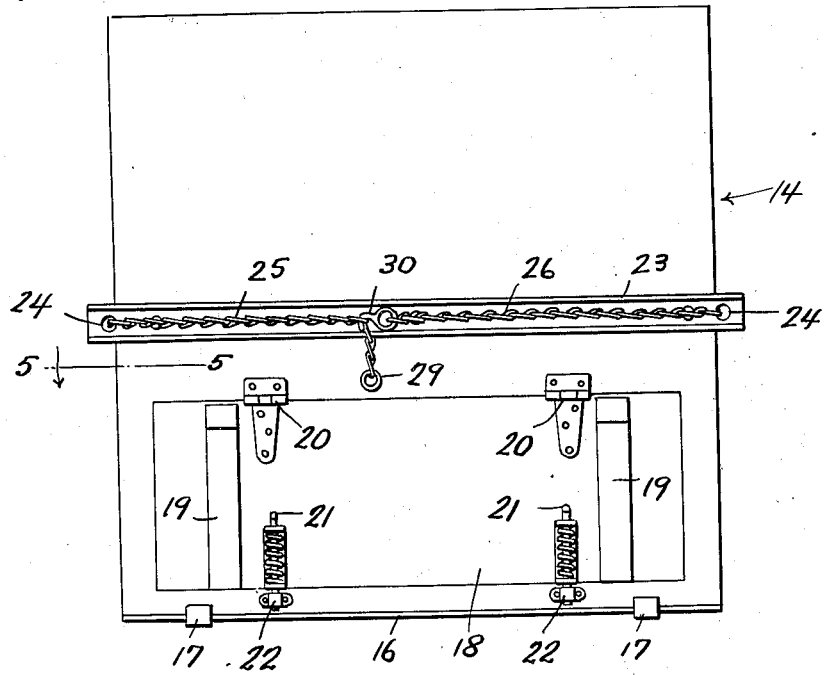
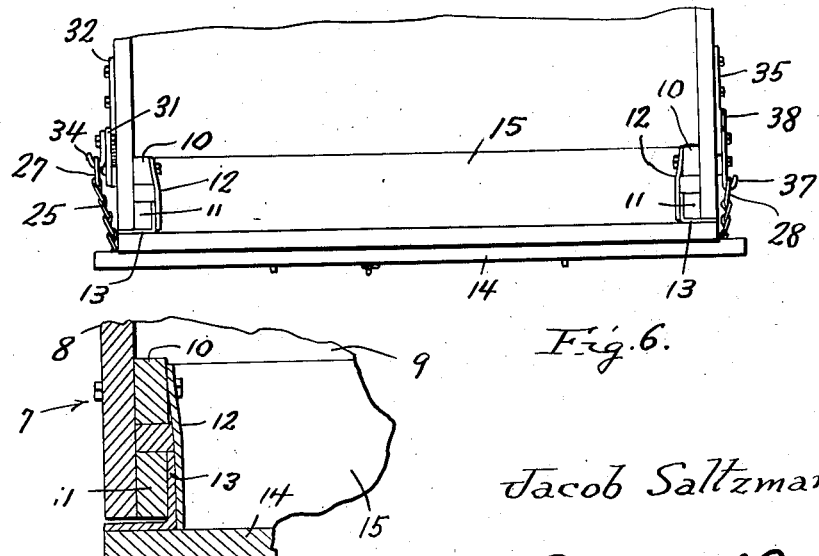
Inventor
Jacob Saltzman
By Clarence A. O'Brien
Attorney Patented Mar. 26, 1935

1,995,582

UNITED STATES PATENT OFFICE 1,995,582

END GATE

Jacob Saltzman, Shickley, Nebr.

Application April 4, 1934, Serial No. 719,026

1 Claim. (Cl. 296—57)

This invention relates to an improved end gate of a multiple purpose type such as is usable in connection with conventional farm wagon bodies, particularly of the so-called box type, as well as other vehicles requiring an end gate for load retention purposes.

It is a matter of common knowledge that the small farmer has great need for a wagon equipped with an end gate which will serve many different purposes, such as for example to haul grain, to haul live stock, and to serve in many varied capacities. I have therefore discovered the need for the adoption and use of an end gate structure susceptible of fulfilling these various requirements in a highly satisfactory and dependable manner.

Briefly stated, the improved end gate is of a swingable, detachable duplex type, that is it can be swung down and suspended on chains for expediting scooping ears of corn etc., it can be hoisted up in a substantially perpendicular partly closed position for loading hogs, can be detached entirely, or can serve while in a closed position to permit discharge of the contents by way of a miniature dump gate or closure.

The principal improvement is predicated upon the coacting elements between the gate and discharge end portion of the body of the wagon which features are especially constructed to provide a substantially grain-proof joint between the gate and body that is between the bottom of the body and corresponding portions of the gate as well as between the side walls and complemental portions of the gate.

Other features such as for example the chain tightening and suspension arrangement, will become more readily apparent from the following description and drawings.

In the drawings:

Figure 1 is a side elevational view showing a fragmentary rear end portion of the body with the gate lowered to what is generally known as the scooping position.

Figure 2 is a view similar to Figure 1 showing the gate closed and disclosing portions broken away and shown in section to depict said structural features.

Figure 3 is a view similar to Figure 2 observing the opposite side of the structure.

Figure 4 is a rear end elevation of Figure 2.

Figure 5 is a horizontal section on the plane of the line 5—5 of Figure 4, and

Figure 6 is a top plan view of Figure 2.

Referring now to the drawings and for example to Figure 1 it will be observed that the box like body of the wagon or other vehicle is denoted by the numeral 7 and this includes side walls 8 of appropriate height and a bottom 9. Attached to the side walls at the rear end or discharge end of the body are upstanding spaced parallel spacing cleats 10 and 11. As shown in Figure 5 a metal plate 12 is fastened to the cleat 10 and is spaced from and is free of connection with the cleat 11. This plate 12 serves as a seal or jointing plate for cooperation with a complemental flange 13 carried by the end gate 14. Incidentally, the end gate is shown as constructed of wood and the flange 13 is a part of an angle iron which is attached to the end gate, said flange 13 being adapted to swing in telescoping or into locking connection with the plate 12 as shown in Figure 5. Consequently these parts 12 and 13 constitute a grain proofing joint between the side walls and the end portion of the gate. The cleat 10 serves as a support or attachment for the plate 12 and the cleat 11 as an adapter for the flange 13.

To provide the requisite grainproof connection or joint between the gate and the bottom of the body I have found it expedient and practical to utilize a wear plate 15 which is secured to the bottom and which has its rear end portion bent down to form a gate supporting ledge 16. This is a protector plate and prevents chipping of the bottom of the body. The gate 14, as a unit, rests detachably or removably on this supporting ledge 16. It will be observed however that the ledge 16 carries a pair of longitudinally spaced retaining hooks 17 which serve to keep the gate in position, that is tightly against the rear ends of the side walls 8 of the wagon body. Consequently it will be seen that the grainproofing feature is predicated upon the interlocking flanges of the plates 12 and 13 carried by the wagon body and gate respectively which parts swing into telescoping relationship, together with the bottom wear plates 15 provided with a supporting leg 16 and equipped with retaining hooks 17 for removably holding the gate in position. The presence of the features 15 and 16 prevents wear and tear on the boards forming the bottom of the wagon body and this thereby promotes the requisite grainproof joint at this point.

Although the gate may be of different form it is preferably of a duplex type. That is the main gate is provided with an opening adapted to be closed by a supplemental so-called dump gate 18 as shown in Figure 4. The gate 18 is provided with reinforcing members 19 and is hingedly mounted in place on appropriate hinges 20. The numerals 21 are simply retaining latches carried by the swingable lower edge thereof which latches are cooperable with keepers 22.

I next call attention to the chain lowering and retaining assembly. This comprises a channel iron 23 which is fastened horizontally across the intermediate portion of the primary part of the gate. The end portions of this line extend beyond the corresponding ends of the gate and are formed with apertures 24. I provide two chains 25 and 26 which chains extend forwardly through the apertures 24 and are provided on their forward end with rings 27 and 28 respectively. The chains are also provided at their opposite ends with similar fastenings. That is to say the chain 25 is provided with a ring 29 sufficiently large to prevent it from sliding through the aperture 24 when the gate is lowered to scooping position as shown in Figure 1. The corresponding end of the chain 26 is provided with a hook 30 which is engageable selectively with the links of the chain 25 so as to facilitate tightening of the chain when it is desired to draw the chain tight to aid in holding the gate in closed position.

As shown in Figure 2 the numeral 31 designates a bell crank locking lever mounted on a metal attaching strap 32. This lever is provided with a pivoted leaf or ear 33 carrying a hook 34 for detachable connection of the chain ring 27.

Looking now at the opposite side of the wagon body as shown in Figure 3 it will be observed that there is a similar attaching strap 35 to which a chain anchoring and adjusting arm 36 is pivotally bolted. This arm is provided with a hook 37 to accommodate the chain ring 28. Moreover it is provided with an apertured segment 38 adjustably connectable with the strap 35. By changing the position of the arm by adjusting the segments 38 and bolting it against the strap 35 it is evident that the position of the hook 37 can be changed to tighten or loosen the chain 26 in an obvious manner. Consequently there are several adjustments for the chain. In other words the complemental or adjacent ends of the two chains 25 and 26 are adjustably connected together through the instrumentality of the hook 30 being selectively engageable with the links of the chain 25. Then the opposite or forward end of the chain is provided with rings 27 and 28 adjustably connected with the parts with which they are cooperable. In other words the ring 28 is detachably connectible with the adjusting arm 36 while the ring 27 is connectible with the chain take up and adjusting bell crank lever 31. By turning this lever around to the position shown in Figure 2 it passes beyond dead center and automatically locks the chain in its tightened position. These different devices are sufficient to take up slack in the chain for effectively binding and securing the end gate against the wagon body. It is also evident that the chain serves to permit the gate to be lowered to the scooping position shown in Figure 1 at which time the chains serve as suspension elements. Then the chains permit the gate to be swung up to closed position and effectively locked in said position.

As before stated the principal feature of the invention is predicated upon the interlocking members on the wagon body and gate respectively serving to provide a substantially grainproof joint between the meeting portions of the gate and wagon body. In other words the features 12 and 13 shown in Figure 6 together with the features 15 and 16 and 17 shown in Figure 2 are highly important. Then too the duplex gate itself being of a bodily detachable and swingable type is important particularly when it is equipped with a hinged dump gate 18 of the type shown in Figure 4. The chain means for suspending the gate as well as locking it in closed position is equally important.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

Having thus described my invention, what I claim as new is:

In a structure of the class described, in combination, a wagon body, an end gate, a channel iron carried by said end gate, said channel iron being provided with chain apertures, chains extending slidably through said apertures, one of said chains being provided at opposite ends with rings, the remaining chain being provided at one end with a ring, at the opposite end with a hook selectively engageable with the links of the first named chain, and a hook equipped bell crank locking lever mounted on one of the side walls of said wagon body, the adjacent ring of said first named chain being engageable with said last named hook.

JACOB SALTZMAN.